March 13, 1962 B. A. GREGORY 3,024,849
PEANUT DIGGING MACHINE
Filed March 31, 1960 3 Sheets-Sheet 1

INVENTOR
Buck A. Gregory
BY George M. Anderson.
ATTORNEY

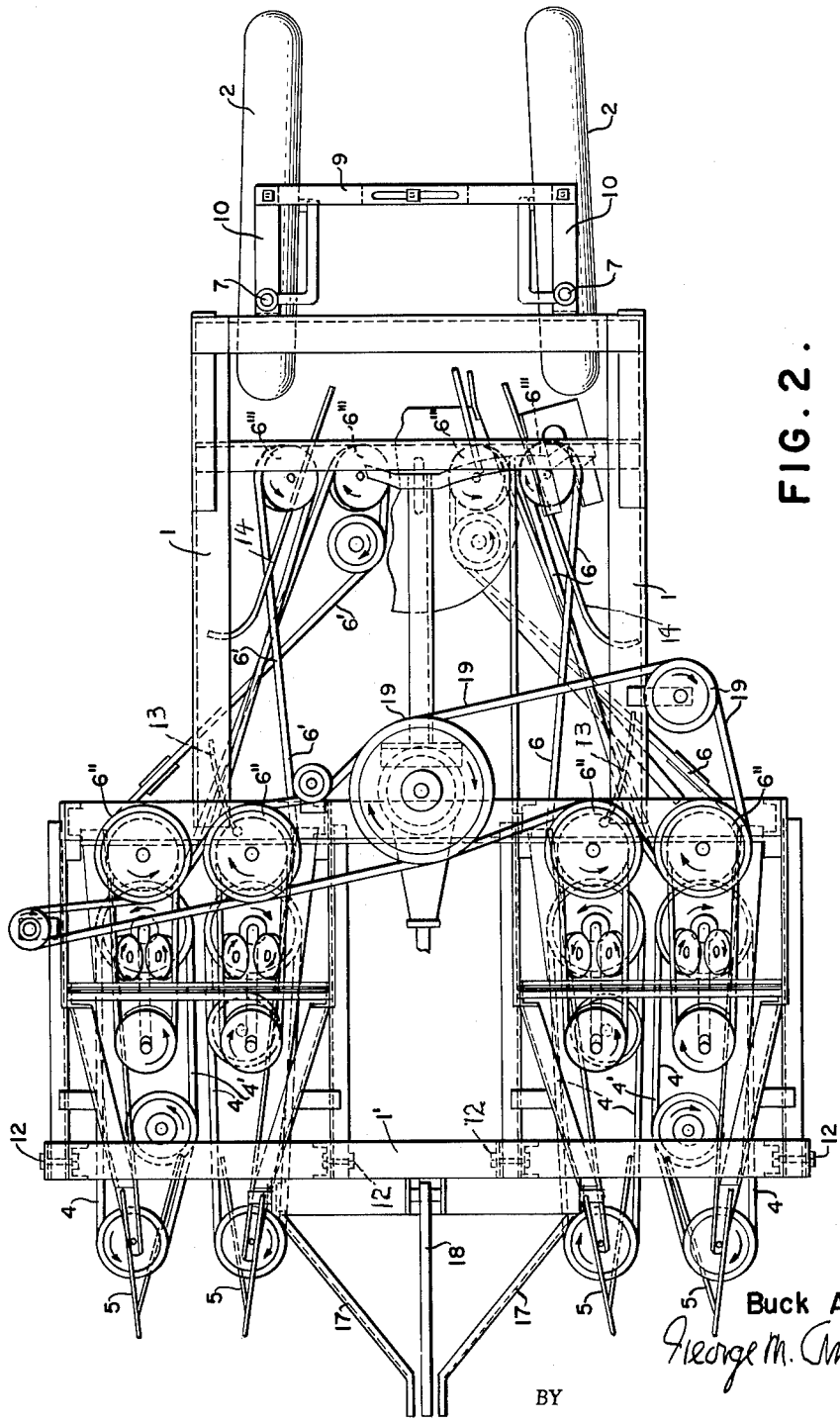

March 13, 1962  B. A. GREGORY  3,024,849
PEANUT DIGGING MACHINE
Filed March 31, 1960  3 Sheets-Sheet 3
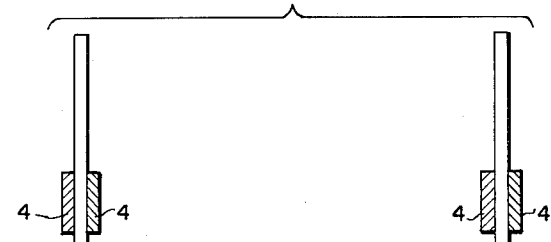
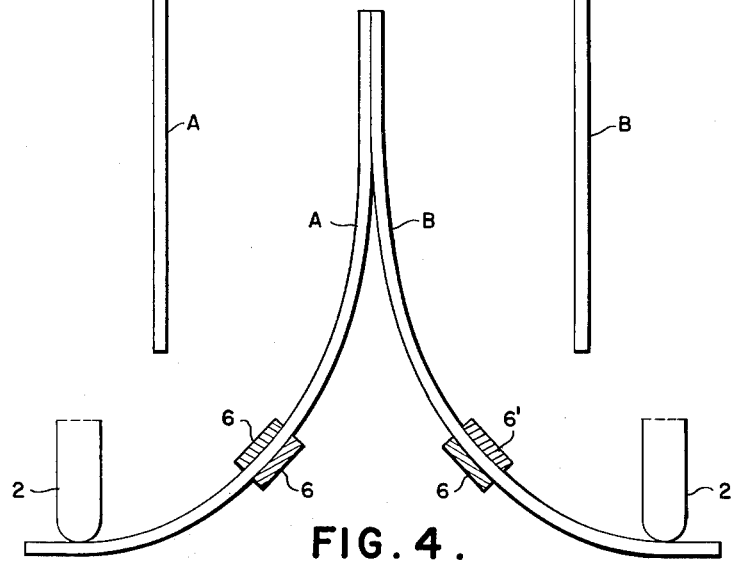
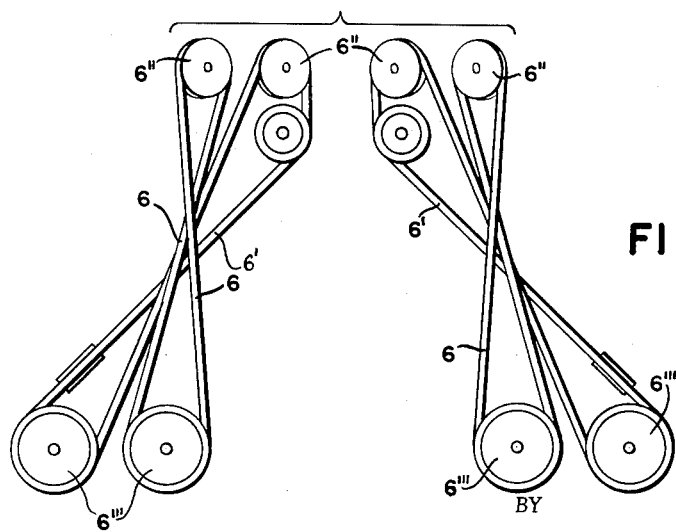
INVENTOR
Buck A. Gregory
BY George M. Anderson.
ATTORNEY

United States Patent Office 3,024,849
Patented Mar. 13, 1962

3,024,849
PEANUT DIGGING MACHINE
Buck A. Gregory, 1512 S. Ave. G, Portales, N. Mex.
Filed Mar. 31, 1960, Ser. No. 18,900
3 Claims. (Cl. 171—61)

The invention relates to peanut diggers, an object being to provide a peanut digging machine adapted to be drawn by a tractor for simultaneously digging two rows of peanut vines and stacking the two rows in a single row upon the ground to dry. Another object is to dispense with more manual labor and get better results than has hitherto been possible, and lessening the time required, thereby avoiding danger of spoilage of the crop due to delay in digging and drying. Other objects and advantages will appear hereinafter, or will be obvious.

The invention consists in the novel construction and combinations of parts and in the method hereinafter set forth in the claims.

In the accompanying drawings,

FIGURE 2 is a plan view of the same, parts being broken away.

FIGURE 3 is a diagrammatic cross-section, not drawn to scale, taken through the front belts 4, to show the upstanding position of the vines A and B of the two rows.

Figure 1:
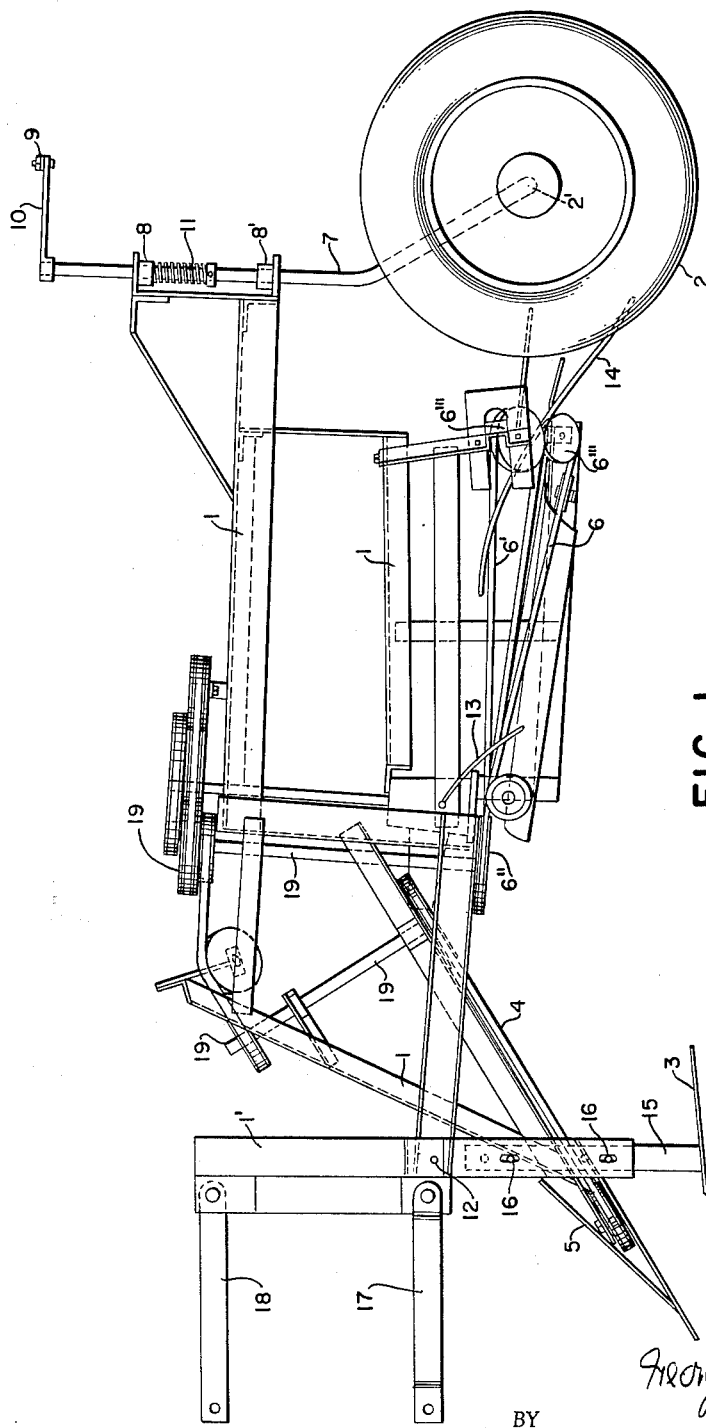
FIGURE 1 is a side view of the machine, showing the links for connection with the tractor.

FIGURE 4 is a view similar to FIGURE 3 taken through the rear end portion of the rear belts 6 showing the ⅜ twist of the rear belts, the vines A and B leaning against and mutually supporting each other in a single upstanding stacked row, whereof the tops of the vines of the two rows are spaced apart and located adjacent the supporting wheels 2, which as the machine moves forwardly press said tops on the ground to keep the stacked row in place.

FIGURE 5 is a detail plan view of the two pairs of rear belts and their pulleys.

Referring to the drawings, 1 designates the machine frame, having rear parallel supporting wheels 2, the machine being adapted to be drawn by a tractor, not shown.

Said frame is provided at its lower forward portion with plow blades 3 having sharpened forward edges and normally resting on the ground, for lifting and loosening the roots of the vines of the two rows A and B in the soil, said plow blades being slightly inclined.

Said frame is provided with two pairs of generally parallel upwardly inclined endless front belts 4, and 4' for carrying the vines of the two rows upwardly and rearwardly and entirely lifting the roots of the vines from the soil.

Said frame is provided with upwardly inclined rods or horns 5, located forwardly of and vertically spaced from said plow blades, for lifting the tops of the vines of the two rows from the ground and positioning them within the forward end portions of said front belts so that they will be caught thereby as the machine moves forwardly. The forward end portions of said front belts are located forwardly of and vertically spaced from said plow blades between said rods and said blades.

Said frame is provided with two pairs of downwardly inclined rearwardly converging endless rear belts 6 and 6' and their pulleys 6" and 6'", the rear pulleys 6''' for the rear belts of each pair being located in converging planes so that they are angularly disposed, the runs of each individual belt of each pair crossing one another, the collective runs of both belts of each pair crossing one another, each individual belt of each pair being twisted three-eights of a complete twist, for carrying the vines of the two rows downwardly and rearwardly, turning the vines three-eights of a complete turn, bringing the roots of the vines of the two rows together and uppermost and the tops spaced apart, and discharging the vines of the two rows in a single row upon the ground in stacked relationship with said tops in front of and adjacent said supporting wheels 2, so that said tops will be pressed on the ground by said wheels as the machine moves forwardly, thereby keeping the stacked row in place against weather conditions. In the single stacked row the two rows lean together and mutually support each other. The roots of the vines uppermost in the stacked row bear the peanuts, which being raised from the ground drying is facilitated. The lower forward end portions of said rear belts are located forwardly of below and vertically spaced from the upper rear end portions of said front belts so that the vines carried upwardly by said front belts will be delivered to and caught by said rear belts as the machine moves forwardly. The lower rear ends of said rear belts are located in front of and adjacent said wheels 2.

The machine is provided with manually operable means described as follows for adjusting and holding said supporting wheels 2 in parallel as adjusted in either of opposite directions. Two parallel vertical transversely spaced rods 7 have upper and lower vertically spaced bearings 8 and 8' in the machine frame, each of said rods having at its lower end connection with the journal pin 2' of the related wheel 2 an upper horizontal transverse handle bar 9, has at its ends crank connections 10 with the upper ends of said rods 7, coiled springs 11 are located upon said rods between said spaced bearings, said springs being equally tensioned, said wheels 2 being each independently yieldable vertically against the tension of the related spring, thereby maintaining the machine frame normally positioned with its rear end constantly level against ground inequalities.

The machine frame consists of a horizontally directed main frame 1, and a front vertically directed plow blade frame 1' carrying the plow blades at its lower end and having intermediately of its height horizontal hinged connections by bolts 12 with said main frame. Said main frame is liftable pivotally upon said wheels 2, said plow blade frame 1' being simultaneously pivotally adjustable upon bolts 12 with respect to said main frame and liftable therewith, thereby raising said plow blades from the ground in turning corners and transportation from place to place.

Spring steel rods 13 mounted upon the machine frame push the tops of the vines outwardly and downwardly as the vines are being delivered from said front belt pairs within and caught by said rear belt pairs. As the vines are being discharged from said rear belt pairs of rods 14 mounted upon the machine frame push the tops of the vines outwardly and downwardly and hold said tops down in front of and adjacent said wheels 2.

The plow blades 3 are each mounted upon a lower extension 15 of the plow blade frame 1', said extension having vertically adjustable slot and bolt connections 16 with frame 1'.

The tractor, not shown, is connected with the machine frame by means of two lower transversely spaced links 17 and an upper link 18 vertically spaced from and centrally disposed with respect to said lower links, said links 17 and 18 having at the ends thereof pivotal connections with the tractor and the machine frame. Power exerted by the tractor pulls the machine forwardly by means of said lower links 17. Reverse power exerted upon said lower links 17 will raise the machine pivotally upon said supporting wheels 2 and will simultaneously cause the plow blade frame 1' to pivot upon said hinge bolts 12 and become angularly disposed with respect to the main frame 1.

Any suitable drive means may be used for the pulleys of the front and rear pairs of belts. As shown this drive means is generally characterized by the numeral 19.

The parts of the main frame 1 and of the plow blade frame 1' are welded or bolted together.

I claim:

1. In a peanut digging machine adapted to be drawn by a tractor, means for simultaneously digging two rows of peanut vines and stacking the two rows in a single row upon the ground to dry, comprising a machine frame having two rear transversely spaced supporting wheels, plow blades for lifting and loosening the roots of the vines of the two rows in the soil, two pairs of generally parallel upwardly inclined endless front belts for carrying the vines of the two rows upwardly and rearwardly and entirely lifting the roots of the vines of the two rows from the soil, upwardly inclined rods disposed forwardly of and vertically spaced from said plow blades for lifting the tops of the vines of the two rows from the ground and positioning them within the forward end portions of said front belts, and means comprising two pairs of downwardly inclined rearwardly converging endless rear belts for carrying the vines of the two rows downwardly and rearwardly and discharging the vines upon the ground in a single upstanding stacked row, the forward end portions of said front belts being disposed forwardly of and vertically spaced from said plow blades between said rods and said blades, the upper forward end portions of said rear belts being disposed below and vertically spaced from the upper rear end portions of said front belts, the lower rear end portions of said rear belts being disposed in front of and adjacent said supporting wheels.

2. A peanut digging machine as defined in claim 1 in which the runs of each individual belt of each pair cross one another; and the collective runs of both belts of each pair cross one another and each individual belt of each pair is twisted three-eighths of a complete twist.

3. A peanut digging machine as defined in claim 2 in which the machine frame comprises a horizontally directed main frame, and a forwardly disposed vertically directed plow blade frame carrying said plow blades at its lower end and having intermediately of its height horizontal hinge bolt connections with said main frame, said main frame being liftable pivotally upon said wheels, said plow blade frame being simultaneously pivotally adjustable upon said bolt connections with respect to said main frame and liftable therewith to raise said plow blades from the ground.

References Cited in the file of this patent

UNITED STATES PATENTS

| | | |
|---|---|---|
| 2,288,985 | Zuckerman | July 7, 1942 |
| 2,540,094 | Brown et al. | Feb. 6, 1951 |
| 2,581,661 | Hume | Jan. 8, 1952 |
| 2,854,083 | Wetzel | Sept. 30, 1958 |
| 2,907,393 | Hawkins | Oct. 6, 1959 |